United States Patent [19]

Wolkovitch

[11] 4,365,773

[45] Dec. 28, 1982

[54] JOINED WING AIRCRAFT

[76] Inventor: Julian Wolkovitch, 2109 Prestonwood Dr., Arlington, Tex. 76012

[21] Appl. No.: 189,069

[22] Filed: Sep. 22, 1980

Related U.S. Application Data

[63] Continuation of Ser. No. 29,034, Apr. 11, 1979, abandoned.

[51] Int. Cl.³ .......................... B64C 39/08; B64C 3/00
[52] U.S. Cl. ................................. 244/45 R; 244/199; 244/123
[58] Field of Search ..................... 244/13, 45 R, 45 A, 244/46, 106, 49, 199, 91, 123, 130, 131, 36, 124, 35 R

[56] References Cited

U.S. PATENT DOCUMENTS

| | | | |
|---|---|---|---|
| 2,343,645 | 3/1944 | Dickinson et al. | 244/106 |
| 2,406,625 | 8/1946 | Oglesby | 244/45 R |
| 2,984,439 | 5/1961 | Fletcher | 244/130 |
| 3,780,969 | 12/1973 | Nussbaum et al. | 244/123 |
| 3,834,654 | 9/1974 | Miranda | 244/45 R |
| 3,845,918 | 11/1974 | White, Jr. | 244/199 |
| 4,053,125 | 10/1977 | Ratony | 244/45 R |
| 4,090,681 | 5/1978 | Zimmer | 244/45 R |
| 4,146,199 | 3/1979 | Wenzel | 244/35 R |

FOREIGN PATENT DOCUMENTS

| | | | |
|---|---|---|---|
| 2726589 | 12/1977 | Fed. Rep. of Germany | 244/199 |
| 833154 | 10/1938 | France | 244/124 |

Primary Examiner—Galen L. Barefoot
Attorney, Agent, or Firm—Romney, Golant, Martin, Disner & Ashen

[57] ABSTRACT

An aircraft having a fuselage and a pair of first airfoils in the form of wings extending outwardly from the vertical tail and a pair of second airfoils in the form of wings extending outwardly from the forward portion of the fuselage at a lower elevation than the first airfoils. The second wings extend rearwardly having a positive dihedral so that the tip ends of the second airfoil are located in close proximity to and may overlap the tip ends of the first wings. The pairs of wings along with the fuselage present a double triangle or diamond shape in both front elevational view and top plan view. A winglet structurally connects the tip ends of the corresponding first wings and second wings, and these winglets have airfoil surfaces which extend vertically substantially beyond the tip ends of the first and second wings in order to minimize the effects of induced drag and also to augment directional stability of the aircraft. In addition, a unique wing structure is disclosed where the average thickness varies along the chord of the wing to enhance resistance to the component of lift acting normal to the spanwise plane containing the centroids of the airfoils.

5 Claims, 22 Drawing Figures

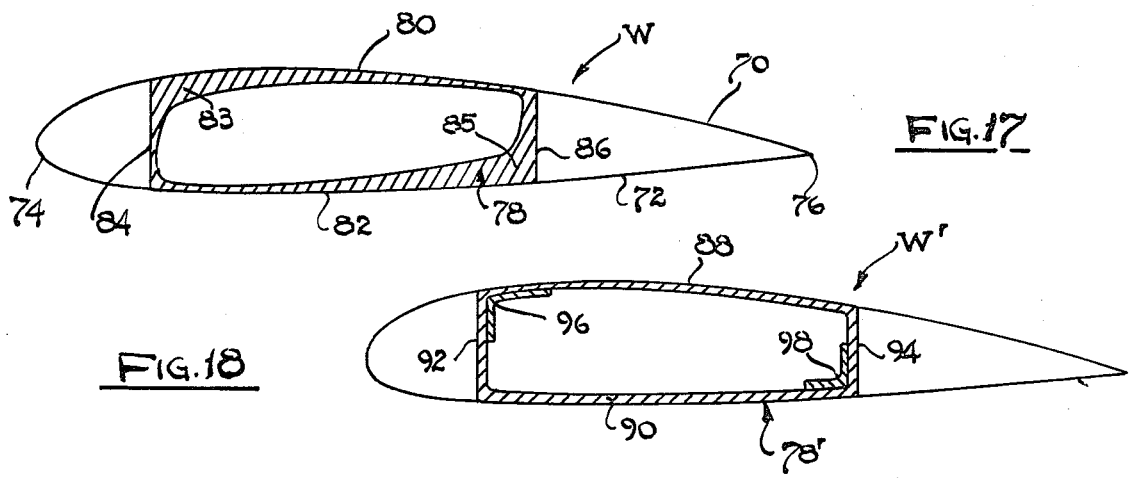
FIG. 17
FIG. 18
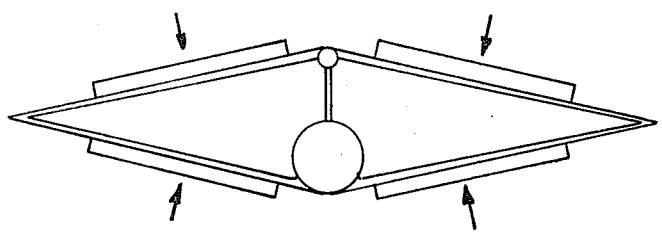
FIG. 19   PITCH CONTROL
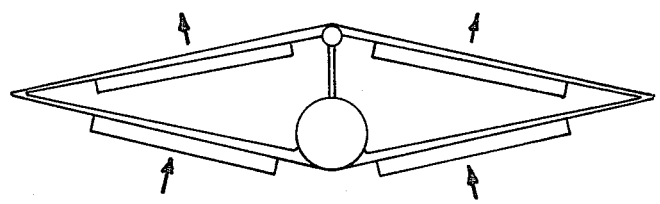
FIG. 20   DIRECT LIFT CONTROL
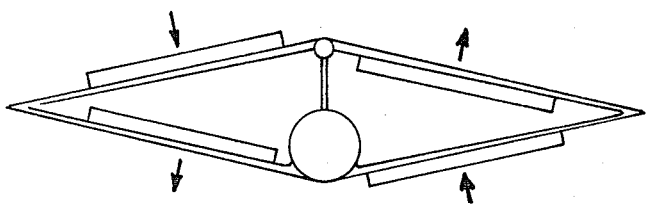
FIG. 21   ROLL CONTROL
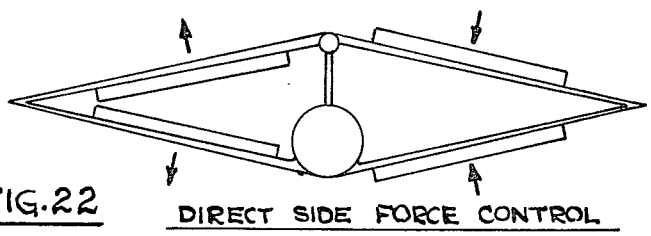
FIG. 22   DIRECT SIDE FORCE CONTROL

JOINED WING AIRCRAFT

This application is a continuation of application Ser. No. 029,034, filed Apr. 11, 1979, now abandoned.

BACKGROUND OF THE INVENTION

1. Field of the Invention

This invention relates in general to certain new and useful improvements in joined winged aircraft, and more particularly, to aircraft of the type stated which employ dual airfoil structures invluding forward and aft pairs of wings structurally joined by members which also function to improve the aerodynamic quality of the aircraft.

2. Brief Description of the Prior Art

A number of prior patents including applicant's U.S. Pat. No. 3,942,747 have described joined wing aircraft. Most of the prior art designs are either deficient misdirected or inadequate. By way of example, the following patents have been considered:

U.S. Pat. No. 4,090,681 to Zimmer discloses an aircraft with two sets of wings which form a closed frame in front elevational view. All of the wings are both swept rearwardly with respect to the fuselage. In addition, the rearwardmost wings attach to the fuselage at a lower elevation than the front wings. While the aircraft in the Zimmer patent includes a tail fin, this tail fin does not structurally support the wing.

U.S. Pat. No. 3,981,460 to Ratony shows an aircraft design with sweptback and swept forward wings which are constructed so that they form a closed triangular or diamond-shape frame in front elevational view. However, in the Ratony patent, there is no tail fin employed to brace the rear wings.

U.S. Pat. No. 1,836,896 to Brown illustrates an aircraft which employs three sets of wings in a tripod-type arrangement. Two of these wings are described as being "substantially in the same plane". Hence, the dihedral angles of the two wings are equal or approximately equal, and the dihedral angles formed are small or zero. In addition to the above, the two pairs of wings form a diamond-shape in the top plan view. The additional, or the third pair of wings, incorporates a large dihedral angle in order to form the triangular configuration in front view. The two upper or coplanar wings have a common tip surface which is also coplanar with the upper wings. While this type of arrangement does produce a high strength to weight ratio, it nevertheless has very significant disadvantages due to the interference drag of the numerous joints which are required to connect the three wing elements.

U.S. Pat. No. 3,834,654 to Miranda discloses an aircraft construction which uses forwardly swept upper wings and rearwardly swept lower wings which are connected by vertical elements in order to form a rectangular (box) configuration in front elevational view. This construction presents various disadvantages in that the so-called "boxplane" configuration inherently has low structural stiffness against side forces due to the fact that it has no diagonal members. In the older types of low-speed bi-planes the structural stiffness against side forces was provided by bracing wires.

U.S. Pat. No. 2,576,294 to Geraci discloses a boxplane configuration, in which the members forming the box are curved thereby presenting convex outer surfaces in front elevational view. Each end of the box bulges outwardly. In addition, and in a manner similar to the aforesaid Zimmer patent, both the front and aft wings are sweptback so that in plan view a diamond shape is not formed.

U.S. Pat. No. 1,453,830 to Coakley also discloses an aircraft having a wing structure comprised of superposed wings which also form one or more diamond shapes in at least front elevational view. Coakley does not describe the use of a fin to provide a central vertical member for a diamond configuration. While Coakley does not describe a plan view of his aircraft wing configuration, it is clear that it cannot be diamond-shaped with only two wings since it is stated that the airfoils are superposed. Thus, they must have similar sweep angles.

British Pat. No. 508,022 to Warren and Young describes an aircraft configuration having sweptforward rear wings and sweptback front wings. The wings are joined by common tip surfaces, much in the same manner as the configuration in the Brown patent, supra. These common tip surfaces are coplanar or at least approximately coplanar with at least one of the wings.

French Pat. No. 42,428 to Hausson also discloses an aircraft in which the front wings are swept back and have a negative dihedral while the rear wings are swept forward and have a positive dihedral. Hausson states that his wings are connected at their tips, but the means of connection is not described though the drawings seem to indicate a common tip surface similar to the Warren and Young arrangement.

U.S. Pat. No. 4,053,125 to Ratony also discloses a joined wing aircraft where the front wings have little or no dihedral and the rear wing roots are not attached to the fin. In addition, a separate tail is illustrated and the wings overlap.

SUMMARY OF THE INVENTION

The inadaquacies of the prior art have been resolved by the present invention which provides for an aircraft comprising a fuselage; a first airfoil connected to the fuselage or to the vertical tail and extending outwardly away therefrom to a tip end; a second airfoil connected to the fuselage at a location lower and forward of the first airfoil and extending outwardly from the fuselage, the second airfoil also extending rearwardly toward the first airfoil so that the tip end of said first airfoil is located in proximity to a portion of the second airfoil; and a winglet structurally connecting the tip end of the first airfoil and a portion of the second airfoil, the winglet having an airfoil section and being twisted and cambered to minimize induced drag.

The invention further includes a winglet for structurally connecting the fore and aft airfoils extending outwardly from the fuselage of an aircraft, the winglet comprising an elongated main body section having a portion thereof adapted to receive and structurally connect extended ends of the fore and aft airfoils of the aircraft; a first airfoil-like element extending generally upwardly from the main body section and having a height such that it will extend for a substantial distance above the extended ends of the fore and aft airfoils; and a second airfoil-like element extending generally downwardly from said main body section for a substantial distance below the extended ends of the fore and aft airfoils.

Still another part of the present invention is a wing construction for an aircraft comprising a wing member having an airfoil surface, and the wing member having a leading edge and a trailing edge, and a box-shaped structure extending longitudinally within the wing member, the box-shaped structure having an upper structural member and a lower structural member, and fore and aft members connecting the upper and lower structural members, the fore member being located in proximity to the leading edge of the wing member and the aft member being located toward the trailing edge of the wing member, and substantial material concentration in proximity to the intersection of the upper member and the fore member, and substantial material concentration in proximity to the intersection of the lower member and the aft member whereby the out-of-plane components of airload are effectively resisted.

It is a general aim of the present invention to provide an improved joined wing aircraft having an improved strength to weight ratio, a greater stiffness and less aerodynamic drag.

It is an aspect of the present invention to provide a joined wing aircraft which has superior characteristics but is relatively inexpensive to manufacture and operate.

An object of the present invention is to provide a joined wing aircraft which has improved directional stability and tip-stalling characteristics.

Another aspect of the present invention is to provide a joined wing aircraft having an improved wing structure for resisting out-of-plane lifting loads.

Still another object of the present invention is to provide an improved joined wing aircraft which is strengthened to resist buckling.

Yet another aim of the present invention is to provide a joined wing aircraft having winglets for reducing induced drag.

Other objects and advantages of the invention will appear from the following description when taken in conjunction with the accompanying drawings.

BRIEF DESCRIPTION OF THE DRAWINGS

FIG. 17 is an elevational sectional view of a wing showing its strengthened interior structure;

FIG. 18 is an elevational sectional view of a wing showing a modified interior strengthening structure.

FIGS. 19-22 are diagrammatic front plan views showing various modes of controlling a joined wing aircraft.

DESCRIPTION OF THE PREFERRED EMBODIMENTS

Figure 1:
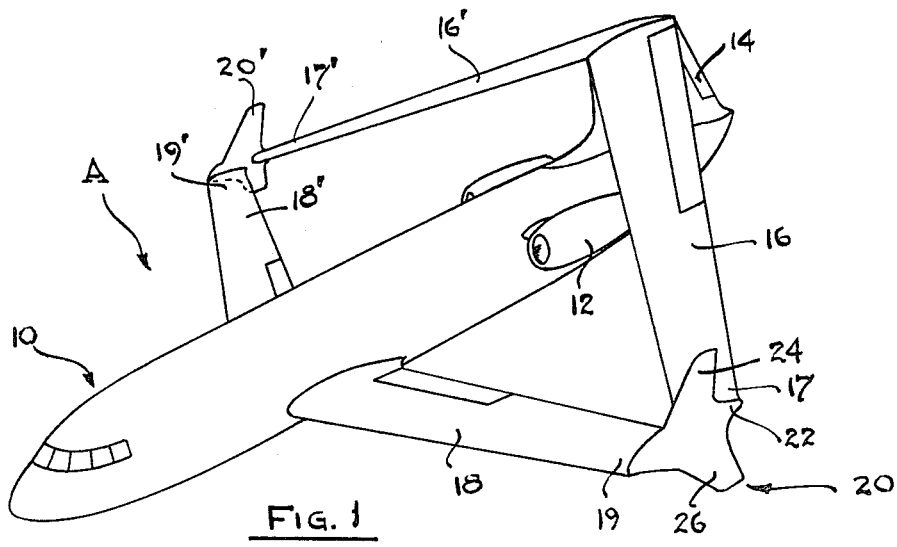
FIG. 1 is a perspective view of a joined wing aircraft having winglets.

While the present invention is susceptible of various modifications and alternative constructions, the embodiments shown in the drawings will herein be described in detail. It should be understood, however, that it is not the intention to limit the invention to the particular forms disclosed; but, on the contrary, the intention is to cover all modifications, equivalences and alternative constructions falling within the spirit and scope of the invention as expressed in the appended claims.

Referring now in more detail and by reference characters to the drawings which illustrate practical embodiments of the present invention, A designates a joined wing aircraft having a fuselage 10 with one or more engines, such as a pair of jet engines 12 connected to the fuselage as shown. Any form of engine for moving the aircraft may be employed in the present invention. Connected to the fuselage at its rearward end is an upwardly projecting tail fin 14.

The aircraft A is provided with a first or rearward pair of wings (often referred to as airfoils) 16 and 16' which are connected to the fuselage by being structurally fixed to the upper end of the tail fin 14. The wings then extend downwardly and outwardly away from the aircraft forming a negative dihedral angle. The aircraft is also provided with a second or forward pair of wings or airfoils 18 and 18' which are structurally connected to the fuselage forward and at a lower elevation than the wings 16, 16'. The forward wings extend outwardly and rearwardly forming a positive dihedral angle. The dihedral angles may each vary from 0° to 30°, though in FIG. 1, the angles are about 15°. The extended or tip ends 17, 17' of the rear wings and the tip ends 19, 19' of the front wings are located in close proximity to each other and lie essentially in the same geometric or horizontal plane. It is to be noted that the tip ends come together at a location to the rear of the aircraft's center of gravity.

Figure 2:
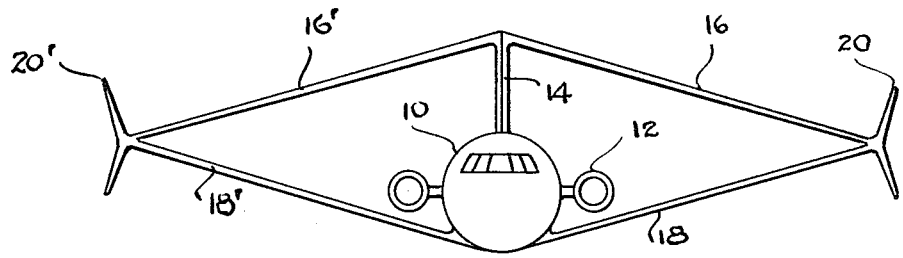
FIG. 2 is a front elevational view of the aircraft of FIG. 1.
Figure 3:
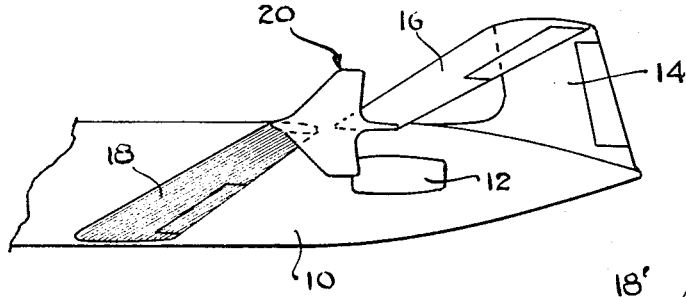
FIG. 3 is a fragmentary side elevational view of the aircraft of FIGS. 1 and 2.
Figure 4:
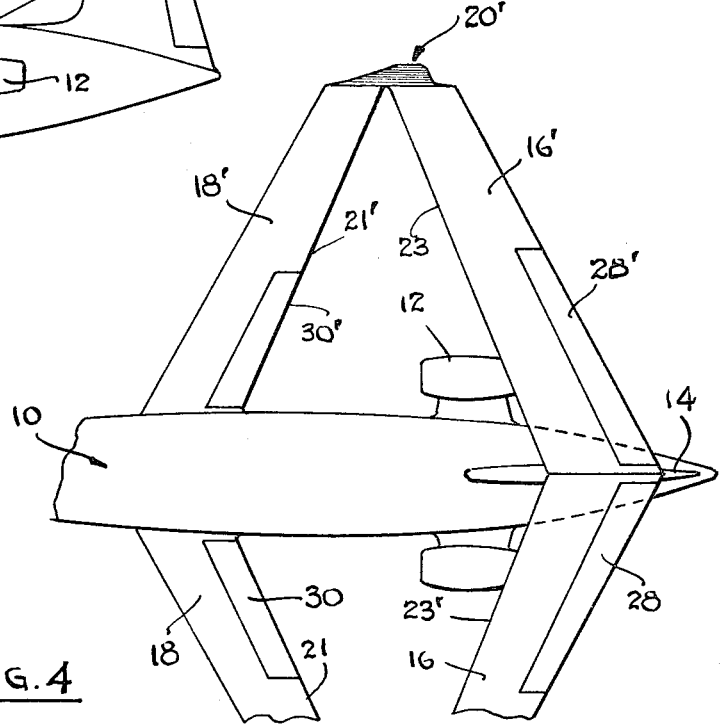
FIG. 4 is a fragmentary top plan view of the aircraft of FIGS. 1-3.

It can be observed that the wings, along with the fuselage present a diamond or double triangle shape in both front elevational view, as illustrated in FIG. 2, and in top plan view, as illustrated in FIG. 4.

It is to be noted that the wings do not necessarily overlap but may abut each other at the tip ends or may be spaced slightly apart from each other in the manner as illustrated in FIG. 4. When the trailing edge 21, 21' of the front wing is set ahead of the leading edge 23, 23' of the rear wing, in the manner as illustrated in FIG. 4, the interference drag of the joint is minimized. However, it may be desirable to allow the outer portion of the front wing to act as a slat for the outer portion of the rear wing so that some overlap exists. This improves the tip-stalling characteristics of the aircraft.

The extended portions or tip ends of the wings 16 and 18 and the tip ends of the wings 16' and 18' are each structurally connected by means of specially shaped and cambered winglets 20 and 20' respectively, as illustrated in FIGS. 1-4. These winglets serve several functions. First, the winglets provide the necessary structural connection required to join the forward and rearward wings. Secondly, the winglets are designed to offset the parasitic drag and and weight penalties of the connecting structure by reducing the airplane's induced drag (also called drag due to lift). When the winglets are properly cambered and twisted, the reduction of induced drag is quite large due to the fact that the steep dihedral of the front wing allows the winglets to extend well below the level of the wing tip ends without encountering ground clearance problems.

Each of the winglets are similar in construction and therefore one such winglet 20 will be described in more detail. The winglet comprises a main body 22 which structurally connects the two wings. Integral with the main body is an upwardly extending fin portion 24 and a downwardly extending fin portion 26 forming a concave surface directed inwardly toward the fuselage as illustrated most clearly in FIG. 2. The fin portions 24 and 26 are preferably of airfoil section and may be cambered and twisted to minimize induced drag. Furthermore, the winglets are designed so that they can develop sideways-acting air loads even when the aircraft itself is not side-slipping. While winglets have been employed in other aircraft, they have not functioned as the winglets of the present invention since winglets do not add structural strength to a cantilever wing.

As can be seen from the drawings, FIGS. 1-4, the vertical dimensions of the winglets can be considerable, perhaps as large as the height of the fuselage. As mentioned earlier, because the lower forward wings 18, 18' have a positive dihedral there is considerable clearance between the tip ends and the ground to support a relatively large winglet.

The winglets are connected so that each wing of the connected wing sets a mutual bracing effect on the other wing due to the fact that a truss structure is formed. Moreover, due to the fact that the front and rear wings may be joined by the winglets, the strength to weight ratio, and the stiffness of the aircraft is improved and the aerodynamic drag is reduced.

Figure 10:
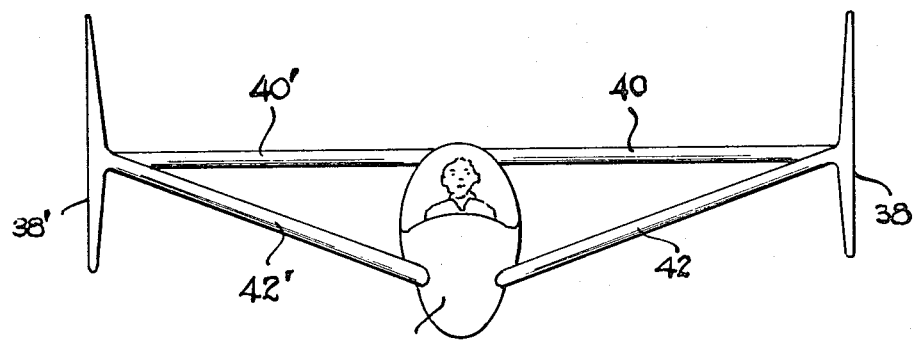
FIG. 10 is a front elevational view of a joined wing aircraft having a rear wing with zero dihedral.
Figure 11:
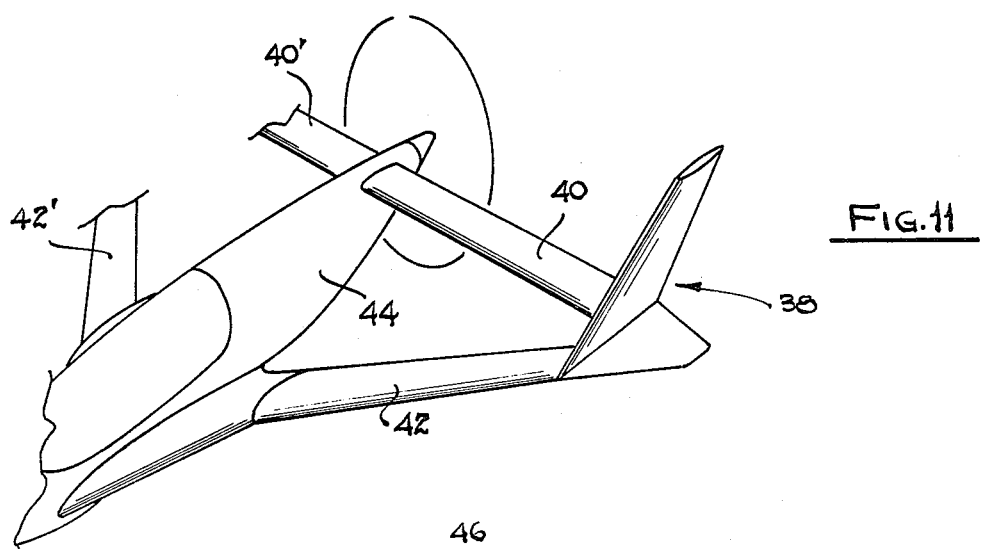
FIG. 11 is a fragmentary perspective view of the aircraft of FIG. 10.

It should be noted that the winglets need not form concave surfaces; see for example, the winglets of FIGS. 10 and 11.

The aircraft A may also be provided with control flaps 28 and 28' on the rearward wings 16 and 16' as well as control flaps 30 and 30' on the front wings 18 and 18', respectively. These control flaps would be connected to the cockpit of the aircraft by suitable linkages (not shown) for operating the aircraft in a manner as shown in FIGS. 19-22.

Figure 5:
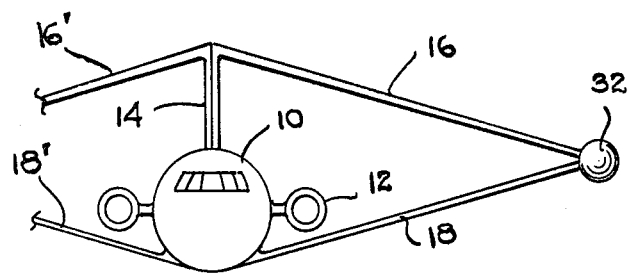
FIG. 5 is a fragmentary front elevational view showing a modified form of aircraft having fairings.
Figure 6:
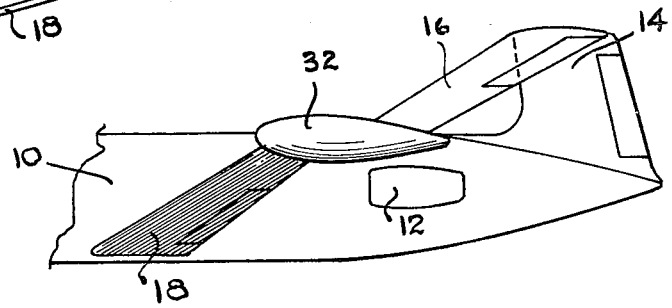
FIG. 6 is a fragmentary side elevational view of the aircraft of FIG. 5.
Figure 7:
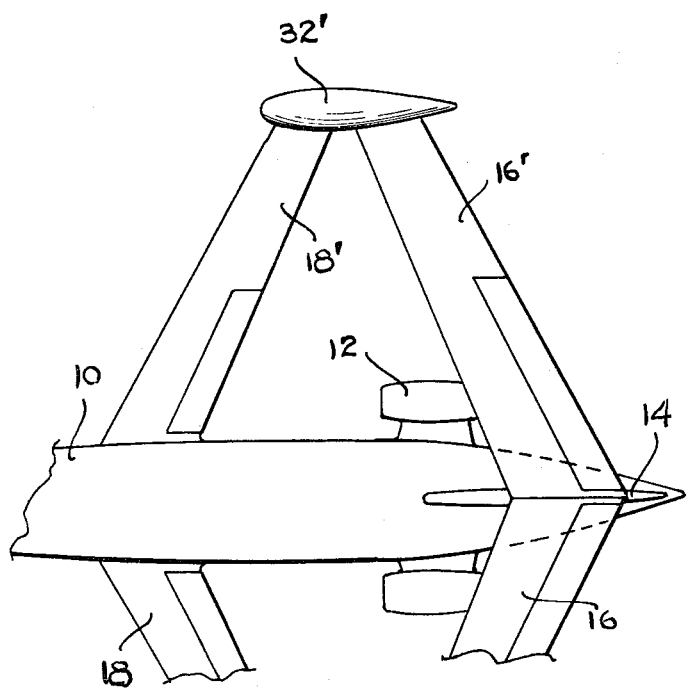
FIG. 7 is a fragmentary top plan view showing the aircraft of FIGS. 5 and 6.

FIGS. 5-7 illustrate another joined wing aircraft embodiment of the present invention in which fairings 32, 32' are substituted for the winglets. Thus, the port rear wing 16 and port front wing 18 are structurally joined by fairing 32 and the starboard rear wing 16' and starboard front wing 18' are joined by the fairing 32'. In each case, the fairings have circular cross sections and are streamlined. The fairings may serve as a fuel tank, or as a container for bombs, missiles or other forms of payload or for landing gear.

Figure 8:
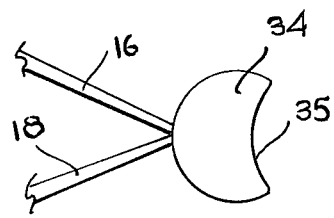
FIG. 8 is a fragmentary front elevational view of an indented fairing.

As mentioned, the fairings are streamlined, though they may be suitably shaped or indented to minimize drag. For example, it can be observed that the fairing 34, FIG. 8 includes an outer surface which is concave inwardly (designated 35). It should be understood that an identical but mirror imaged fairing would be used to connect the wings 16' and 18'.

Figure 9:
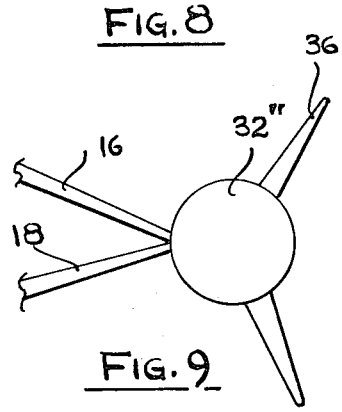
FIG. 9 is a fragmentary front elevational view of a combined fairing and winglet.

Another modification includes the attachment of a winglet 36, FIG. 9, to the fairings in order to obtain a reduction in the induced drag. In this case, it can be observed that a fairing 32 which is circular in cross-section, is used to structurally connect the corresponding front and rear wings and a separate winglet 36. These winglets function in generally the same way as the previously described winglets 20.

Figure 13:
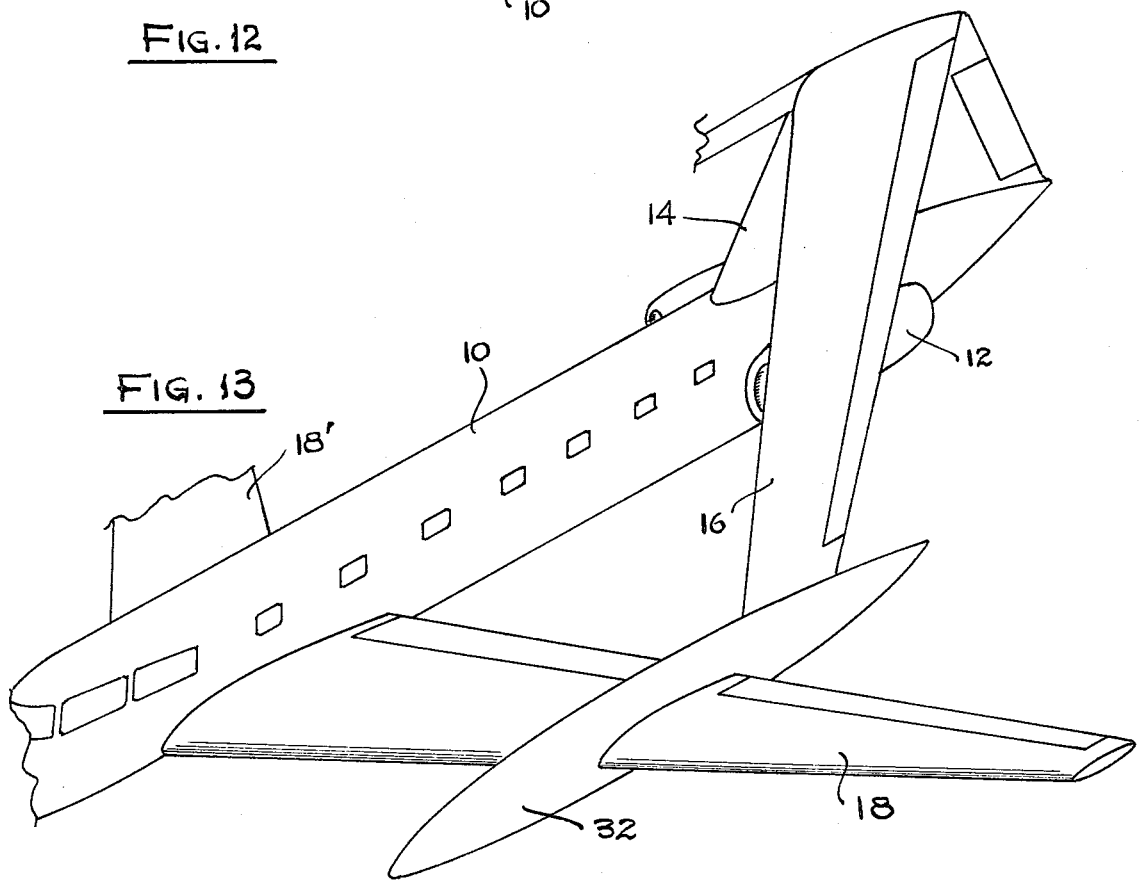
FIG. 13 is a fragmentary perspective view of still another joined wing aircraft which utilizes a midspan wing fairing.

Referring now to FIG. 13, there is an aircraft having fairings 32 located intermediate the fuselage 10 and the extended or tip ends of the front wings 18 and 18'. The rear wing 16 extends downward and forward from the upper portion of the tail fin 14 and is connected to the fairing in the manner as illustrated in FIG. 13.

By utilizing winglets which are located substantially aft of the center of gravity of the aircraft a large contribution to the aircraft's directional stability is provided. Further, with sufficiently large winglets, the central tail fin can be eliminated entirely. In this way, the rear wings may then be mounted directly to the rear portion of the fuselage as shown in FIGS. 10 and 11. In this case, it can be observed that a large winglet 38 connects the rear wing 40 and the front wing 42 and a similarly large winglet 38' connects the rear wing 40' and the front wing 42'. As indicated, these winglets 38 and 38' extend substantially above and below the upper and lower surfaces of the wings where they meet the winglets. Further, it can be observed that the rear wings 40 and 40' are connected directly to the fuselage 44.

Figure 12:
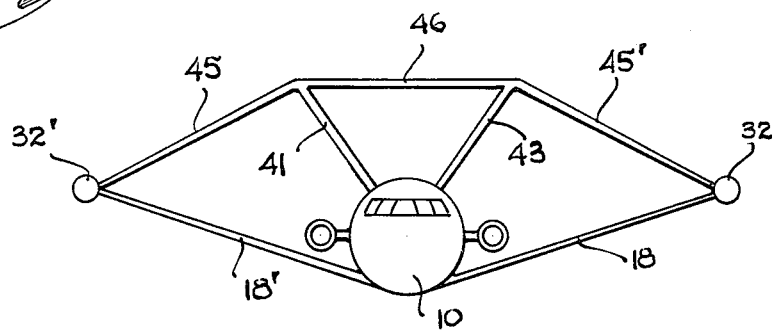
FIG. 12 is a front elevational view of a joined wing aircraft having twin tail fins.

FIG. 12 illustrates another aircraft variation in which the single centrally located and vertically disposed tail fin is replaced by a pair of tail fins 41 and 43, normally called "twin-fins". In this case, it can be observed that the fins incline outwardly and upwardly from the fuselage 10. The front wings 18 and 18' are connected to the fuselage and the tip ends are connected to fairings as was done with the aircraft of FIG. 5. However, the rear wings 45, 45' are connected to the twin tails 41 and 43, respectively, as well as to a bridging wing 46. The advantage of the FIG. 12 aircraft is that additional bracing is provided to strengthen the rear wing's resistance to buckling.

Figure 14:
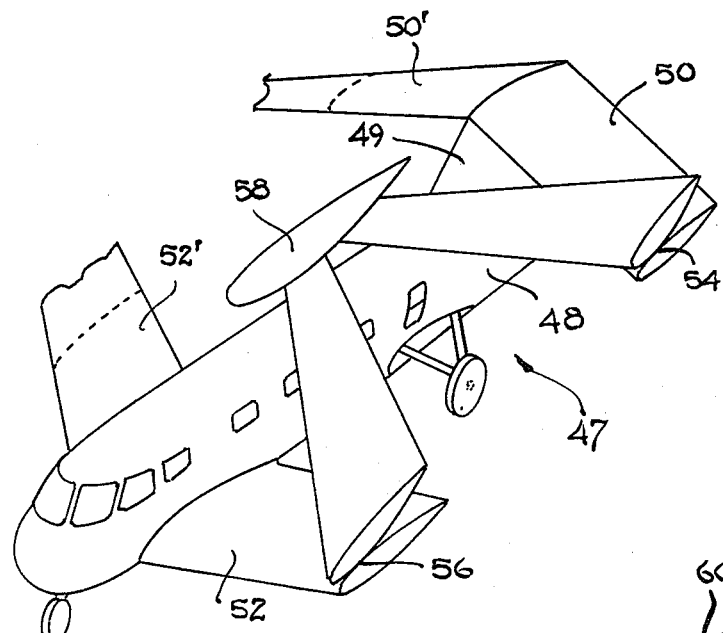
FIG. 14 is a fragmentary perspective view of yet another joined wing aircraft which utilizes wings capable of being folded.
Figure 15:
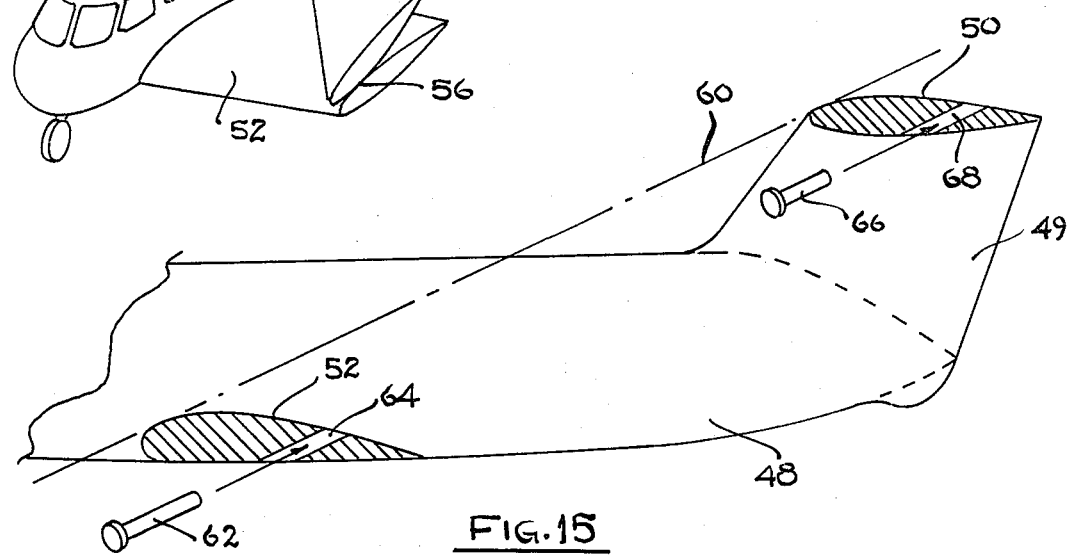
FIG. 15 is a fragmentary side elevational view partially in section showing the manner in which the folding wings of the aircraft of FIG. 14 are locked in place.

For naval applications, an aircraft may be made with joined foldable wings. Such an aircraft is shown in FIGS. 14 and 15. The aircraft 47 includes a fuselage 48 and an upstanding tail fin 49. Extending outwardly and forwardly from the fuselage are a pair of rear wings 50 and 50', which are similar to the previously described wings 16 and 16', respectively. Additionally, a pair of front wings 52, 52' extend outwardly and downward from the fuselage and join the rear wings by fairings, such as the fairing 58. As shown in FIG. 15, each set of wings, such as wings 50 and 52, are foldable along a common "hinge line" 60 with each wing having a suitably placed hinge, such as hinges 54, 56. Locking pins 62 and 64 are received respectively, within bores 64 and 68 formed in the wings to lock the wings in the open or extended position.

Figure 16:
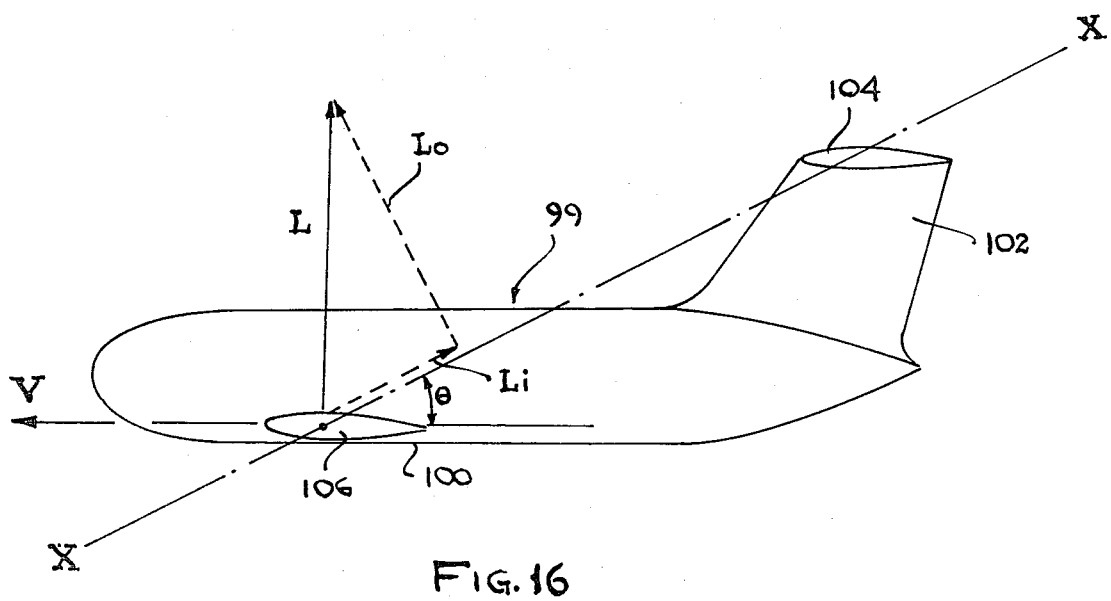
FIG. 16 is a diagrammatic side elevational view illustrating an analysis of the lift load components acting upon a joined wing.

In addition to the various aircraft configurations, a unique wing construction for use in joined wing aircraft is presented and analyzed in FIGS. 16-18. This form of wing construction enables a high strength to weight ratio and excellent stiffness to resist flutter and other undesirable vibrations. Referring to FIG. 17, the wing W includes an upper surface 70, a lower surface 72, a leading edge 74 and a trailing edge 76.

Within the wing is a wing structural box 78 comprised of an upper structural member 80 and a vertically spaced apart lower structural member 82 and fore and aft members, such as front wall 84 and rear wall 86. It can be observed that the front wall 84 is located in proximity to the leading edge of the wing 74 and the rear wall 86 is located closer to the trailing edge 76 of the wing. A substantial material concentration or strengthening region is located about the intersection of the member 80 and the wall 84 and is designated 83. A similar substantial material concentration or strengthening region is located about the intersection of the member 82 and the wall 86 and is designated 85. As shown by the analysis below, this form of material concentration is uniquely advantageous for joined wing airplanes configured as in FIGS. 1, 2, 3, 4, 5, 6, 7, 10, 11, 12 and 13.

FIG. 18 illustrates another variation of the enhanced wing structure having a box 78' with upper and lower structural members 88 and 90 and vertical walls 92 and 94. In addition, L-shaped brackets 96 and 98 are employed at the upper forward corner of the box-like structure (bracket 96) and at the lower rearward corner of the box-like structure (bracket 98). Thus, these brackets serve the same function as the integrally formed material concentrations in the members as previously described. The box-shaped members are the principal load-bearing elements of the wing structure. Another advantage achieved by these wing structural boxes is free space. The space forward of the box can be used to accomodate de-icing equipment or high-lift devices, such as slats, while the space aft can be used for control surface. It is understood, however, that the distribution concept embodied here is not restricted to such structural boxes but may be applied to other wing structural arrangements including fabric-covered wings wherein the major bending loads are supported by spars.

The advantages of this structural distribution can best be appreciated by reference to FIG. 16 which illustrates a joined wing aircraft 99 having a fuselage 100 with a tail 102, a rear wing 104 connected to the upper end of the tail, and a front wing 106 connected to the fuselage at a forward and lower elevation than the rear wing. As described earlier the wings are connected at their extended ends. Lifting loads on the front wing are represented by the vertical line "L" acting on a chordwise section of the wing 106 at a specified distance from the aircraft's plane of symmetry. This lift load L may be resolved into two vector components, one component $L_i$ lies along a line X—X formed by joining the centroids of areas of the front and rear wing sections. The angle $\theta$ subtended by X—X and the direction of flight is called the tilt angle.

Over most of the span, the tilt angle is approximately constant. Hence the components $L_i$ lie approximately within the plane of the truss defined by the front and rear wings. These components are therefore denoted as "in-plane" components, and are effectively resisted by the truss structure formed by the joined wings.

The component of L normal to $L_i$ is denoted as $L_o$ and is called the "out-of-plane" component. This component is not effectively resisted by the truss structure since it acts normal to the plane of the truss. The out-of-plane component is typically a large fraction of L. For example, for $\theta = 30$ degrees, $L_o = 0.866$ L. To resist the out-of-plane components of load the special chord-wise distribution of the wing structural material as shown in FIGS. 17 and 18 is extremely effective.

The special internal wing structure distributes the wing structural material around the region of the airfoil furthest away from the line X—X which at any spanwise station joins the centroids of areas of the wing structural members. FIG. 17 illustrates the typical chordwise variation of wing structural material thickness to resist the out-of-plane component $L_o$. It is noted that for the type of wing structure shown, the material is concentrated so as to maximize the second moment of area about X—X, usually denoted $I_{xx}$. The bending stiffness of the wing about X—X is proportional to $EI_{xx}$ where E is Young's modulus. Hence this distribution of material enables the truss structure formed by the joined wings to effectively resist out-of-plane components of airloads. The same result may also be achieved by employing chordwise variations in E, as shown in FIG. 18. FIG. 18 shows a wing structure in which the out-of-plane stiffness is enhanced by introducing the brackets 96, 98 having higher E than the E of the rest of the structure. These members which are of L-shaped cross-section, but may be of any convenient cross-sectional shape, are located at or near the upper leading edge of the wing structure and also at or near the lower trailing edge of the wing structure.

Another advantage of the described jointed wing aircraft is achieved by virtue of the "high" location of the rear airfoils. By attaching the rear airfoils to the upper most part of the tail fin a relatively large tilt ange ($\theta$) is accomplished. When this is combined with the just described chordwise structural material distribution (FIG. 17 and 18) a high $I_{xx}$ is developed. Hence, there results a strong, stiff yet lightweight wing. Weight reduction means less cost to manufacture and lower fuel costs during operation.

Referring now to FIGS. 19, 20, 21 and 22, it will be seen that the joined wing aircraft has versatile control capabilities. As shown, by moving the control surfaces various forces will operate on the aircraft to give the proper movement. For example, FIG. 19 illustrates pitch control, FIG. 20 illustrates lift control, FIG. 21 illustrates roll control and FIG. 22 illustrates side force control. The inherent capability to produce a wide range of combinations of lift, pitching moment, and side force or rolling moment allows the joined wing aircraft's response to controls to be tailored to best match the pilot's requirements.

Thus, there has been illustrated and described a unique and novel joined wing aircraft in which the wings are joined by members which provide a structural connection as well as enhancing the aerodynamic qualities of the aircraft, and which fulfills all of the objects and advantages sought therefor. It should be understood that many changes, modifications, variations and other uses and applications will become apparent to those skilled in the art after considering this disclosure and the accompanying drawings. Therefore, any and all such changes, modifications, variations, and other uses and applications which do not depart from the spirit and scope of the invention are deemed to be covered by the invention which is limited only by the following claims.

What is claimed is:
1. An aircraft comprising:
   a fuselage having an extended fin in proximity to the rearward end thereof;

a first pair of airfoils connected to said fin; and a second pair of airfoils connected to said fuselage forward of and at a lower elevation than said first pair of airfoils, each of said first pair of airfoils is connected to a corresponding airfoil of said second pair by a streamlined element wherein the extended ends of said first pair of airfoils are in generally the same elevational plane as those corresponding portions of said second pair of airfoils which are fastened to the streamlined elements;

each airfoil has a cross-section construction for at least part of its span having four corner portions in generally a quadrilateral disposition where a first set of diagonally opposing corner portions is strengthened to resist the out-of-plane component of lift load which may be defined as that component of lift load directed perpendicular to a straight line formed by joining the centroids of areas of corresponding airfoils of said first and second pairs, and said first set of diagonally opposing corner portions is stronger than a second set of diagonally opposing corner portions, said first set of diagonally opposing corner portions being located near the upper part of the forward portion and the lower part of the trailing portion of each airfoil; and the elevational distance between the connection of said first pair of airfoils to said fin and second pair of airfoils to said fuselage is sufficiently great to provide a relatively large tilt angle.

2. An aircraft as claimed in claim 1 wherein at a spanwise station each airfoil has a chord-wise distribution of material to approximately maximize the second moment of area about an axis formed by said straight line joining the centroids of said front and rear airfoils at said station.

3. An aircraft as claimed in claim 1 wherein said first set of diagonally opposing corner portions has a greater concentration of material than does said second set of diagonally opposing corner portions.

4. An aircraft as claimed in claim 1 wherein said aircraft has no cantilever airfoils.

5. An aircraft as claimed in claim 1 wherein said streamlined element is a winglet having a height approximately the maximum height of said fuslage.

* * * * *